United States Patent [15] 3,638,545
Kobayashi et al. [45] Feb. 1, 1972

[54] DEVICE FOR CONTROLLING A FLASH CIRCUIT IN A CAMERA

[72] Inventors: Tatsuo Kobayashi, Kaizuka-shi; Yoshikazu Hasegawa, Osaka-shi, both of Japan

[73] Assignee: Minolta Camera Kabushiki Kaisha, Osaka, Japan

[22] Filed: July 30, 1969

[21] Appl. No.: 845,951

[30] Foreign Application Priority Data

Aug. 7, 1968 Japan....................43/56247

[52] U.S. Cl...........................95/11 R, 95/11.5 R
[51] Int. Cl..........................................G03b 19/02
[58] Field of Search................95/11 R, 11.5, 10 C

[56] References Cited

UNITED STATES PATENTS 3,464,333  9/1969  Koichi Aoki et al. ............95/11.5 R X
3,250,193  5/1966  Horton.............................95/64 R X
3,005,392  10/1961 Kaden.............................95/11.5
3,171,337  3/1965  Fischer............................95/11.5
3,257,920  6/1966  Greger et al.....................95/11

Primary Examiner—John M. Horan
Assistant Examiner—Kenneth C. Hutchison
Attorney—Watson, Cole, Grindle & Watson

[57] ABSTRACT

A device for controlling a flash in a camera in accordance with depression of the shutter release mechanism, a desired diaphragm setting, a predetermined range of movement of a distance adjusting mechanism, and a predetermined setting of an exposure control mechanism. The flash circuit is actuated when a first switch contact, moved by rotation of a pointer keeper mechanism in accordance with the setting of the distance adjusting mechanism, contacts a second switch contact, moved by rotation of a control lever rotated in accordance with the setting of the diaphragm control means.

3 Claims, 4 Drawing Figures

DEVICE FOR CONTROLLING A FLASH CIRCUIT IN A CAMERA

BACKGROUND OF THE INVENTION

In the prior art, a switching device for a flash circuit in an automatic exposure camera making use of the pointer of an ammeter as a stopper mechanism is so constructed that one end of the flash circuit is connected to a fixed switch contact mounted on the camera body and the other end of the circuit is connected to a movable contact segment of the switch. The other switch contact is a pointer keeper member movable to engage the pointer of the ammeter in accordance with the position of the pointer, or a pointer scanning member for controlling the diaphragm aperture. Thus by means of the fixed contact and the movable contact the opening and closing of the switch is controlled on the basis of the position of the pointer corresponding to the brightness of an object. In the prior switching devices constructed as described above, it is necessary to purposely provide a fixed contact for the movable contact segment of the pointer keeper member or pointer scanning member and yet in order to allow said movable contact segment to turn, the angle of turning is not constant, in accordance with the brightness of an object to contact securely with the fixed contact for flash photography. It is also necessary to provide contact pressure over a certain extent to said movable segment and fixed contact. Therefore, between the fixed contact and the contact segment a frictional force is exerted to act as a resistance force when the pointer keeper member or pointer scanning member operates, and results in increasing the operating force of a release member.

Further, in prior switching devices it is impossible to control the switch in accordance with the distance of the object from the camera and avoid closing of the switch when the subject's distance is not adjusted for a range suitable for flash photography.

SUMMARY OF THE INVENTION

In order to overcome the drawbacks mentioned above, the device of the present invention is so constructed that the pointer of an ammeter is used as a stopper mechanism in an automatic exposure camera having both a daylight automatic exposure mechanism and a flash automatic exposure mechanism. A retaining member, movable in connection with the setting of the photographic distance and interlocking with the movement of a pointer keeper member, is one movable contact in a flash circuit; and a diaphragm control member is the other movable contact. Thus by contact of the pointer keeper member and the retaining member, the diaphragm aperture for automatic flash photography is attained and at the same time both contacts come into contact with each other so as to close the flash circuit for the operable condition thereof.

The primary object of the present invention is to provide an improved flash circuit control device which does away with the many disadvantages of prior art devices for the same purpose.

A second object of the present invention is to improve the operation and reliability of a flash circuit control device.

A third object of the present invention is to provide a switching device for avoiding the closing of a flash circuit when the photographic distance is adjusted for an unsuitable range for flash photography.

An important feature of the present invention is a switching device comprising a retaining member movable in connection with the distance adjustment mechanism in automatic flash photography which interlocks with the movement of a pointer keeper member for nonflash or normal photography. The device further comprises diaphragm control member for controlling the diaphragm aperture by contacting the retaining member for nonflash photography movable switch contacts for a flash circuit are provided to set the diaphragm aperture for automatic flash photography and at the same time operate the device.

DESCRIPTION OF THE PREFERRED EMBODIMENT

Figure 1:
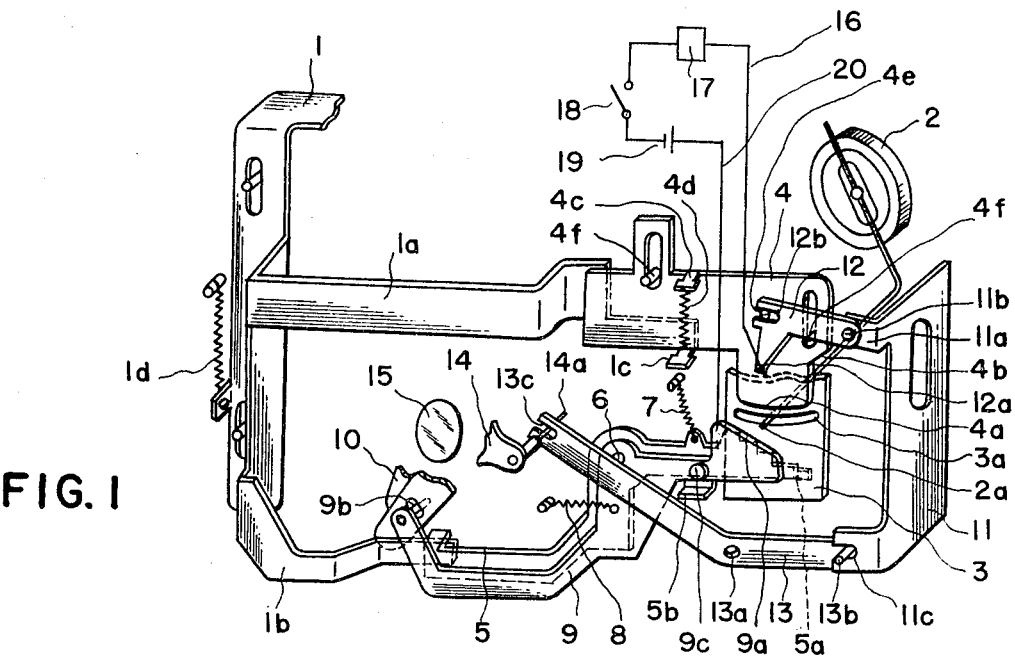
FIG. 1 is a perspective view showing an embodiment of the flash circuit switching control device.

In the embodiment shown in FIG. 1, release lever 1, provided with a guide slot, is movably supported vertically by means of a projection secured to a camera body and biased by spring 1d provided between release lever 1 and the stationary part of the camera body. In the descending track of release lever 1 a well-known shutter release member (not shown) is disposed.

Release lever 1 has rigidly mounted on its upper and lower portions, upper transverse rod 1a and lower transverse rod 1b projecting laterally, upper transverse rod 1a having on its lower edge small tongue 1c projecting horizontally.

Pointer 2a of ammeter 2 projects through slot 3a extending laterally in pointer carrier 3 secured to the camera body so as to move to the right and left along slot 3a.

Pointer keeper plate 4 is movable parallel to pointer carrier 3 and the plane of upper transverse rod 1a of release lever 1 by means of guide slot 4c and a pin. It is provided with pointer keeper portion 4a which is located adjacent to slot 3a except at the right end cutaway portion of the slot. Notched step 4b faces the right end of slot 3a. Small tongue 4c faces small tongue 1c provided on upper transverse rod 1a. Between these two tongues 1c, 4c, tension spring 4d is provided so as to press the lower edge of pointer keeper plate 4 onto small tongue 1c of upper transverse rod 1a.

On the front of pointer keeper plate 4, working pin 4e is provided so as to engage with a retaining member described hereinafter.

Pointer-scanning lever 5 has one end engaging with lower transverse rod 1b of release lever 1 and the other end provided with steps 5a for engaging with pointer 2a which projects through slot 3a of pointer carrier 3 for daylight automatic photography and for determining the diaphragm aperture setting in accordance with the position of pointer 2a. Pointer-scanning lever 5 is rotatably supported by shaft 6 and biased with a counterclockwise rotating tendency by means of spring 7. Therefore, pointer-scanning lever 5 is rotated clockwise against the force of spring 7 by means of lower transverse rod 1b which is kept normally in a rising position, and stepped portion 5a is retracted from pointer 2a.

Diaphragm control lever 9 for controlling flash photography is supported around shaft 6 coaxially with pointer-scanning lever 5, so as to be placed on projection 5b provided on said pointer-scanning lever 5, and is biased with a clockwise rotating tendency by means of spring 8 which is weaker than spring 7. Pin 9c faces projection 5b and is pressed into contact with projection 5b because of the initial counterclockwise rotation of pointer-scanning lever 5. One end of diaphragm control lever 9 is connected with diaphragm blade 10 for opening and closing the diaphragm aperture of photographic lens 15 and the other end is provided with control cam face 9a located a little above stepped portion 5a of pointer-scanning lever 5. Cam face 9a is turned, together with stepped portion 5a, using shaft 6 as a fulcrum, by pushing release lever 1 downwardly; however, it does not come into contact with pointer 2a while rotating.

On the side of pointer carrier 3 is sliding plate 11 slidably up and down relative to the camera body by means of guide slot 4f and a pin (not shown). On the lug 11a at the upper end of sliding plate 11 there is provided pin 11b on which retaining member 12 is pivoted. In notched slot 12b on the end of retaining member 12, pin 4e of pointer keeper plate 4 is mounted to engage with slot 12b. On the lower part of member 12 stopper surface 12a is formed. Fork 11c, on the lower lug of sliding plate 11, engages with pin 13b provided on one end of connecting rod 13 which is supported on the camera body at pin hole 13a. Fork 13c, formed on the other end of connecting rod 13, engages with working pin 14a of photographing distance adjusting member 14 for photographic lens 15.

Between lead wire 16 connected electrically with stopper surface 12a and lead wire 20 connected electrically with diaphragm control lever 9, there is connected a flash circuit-comprising flash device 17, synchro-contact 18, and electric power source 19. A switch is formed by stopper surface 12a and diaphragm control lever 9 for controlling flash photography. The functioning of the apparatus for daylight, flash, and flash inhibit operation will be more readily understood with respect to the following description taken in conjunction with FIGS. 1-4.

Figure 2:
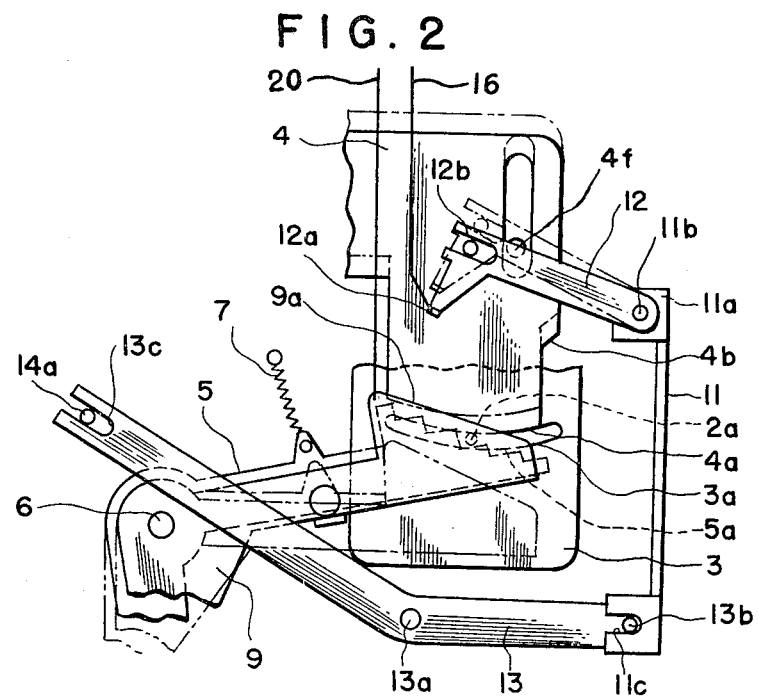
FIG. 2 is a front view of the switching device illustrating the position of the components for daylight automatic exposure photography.

In the case of daylight automatic exposure as illustrated in FIGS. 1 and 2, pointer 2a of ammeter 2 moves from the right toward the left end position in slot 3a of pointer carrier 3 in accordance with the brightness of an object. In this situation, after adjusting the photographic distance by means of adjusting member 14, release lever 1 is pressed downwardly to cause pointer keeper plate 4 to be moved downwardly by tension spring 4d. The simultaneous downward movement of upper transverse rod 1a and pointer keeper portion 4a checks pointer 2a against pointer carrier 3. Simultaneously therewith, as a result of the downward movement of lower transverse rod 1b, pointer-scanning lever 5 is rotated counterclockwise, accompanied by diaphragm control lever 9, by the force of spring 7. One step of stepped portion 5a comes into contact with checked pointer 2a, and accordingly the above-described rotational movement is stopped. In this case, the angle of rotation is determined in accordance with the position of pointer 2a. At this juncture, diaphragm control cam 9 a has not yet come into contact with stopper surface 12a, so that the angle of rotation of diaphragm control member 9 is exclusively fixed by the angle of rotation of pointer-scanning lever 5. In accordance with such angular rotation diaphragm blade 10 is operated so as to automatically set the diaphragm aperture for photographic lens 15 and permit daylight automatic exposure. Furthermore, in this case it is also possible that in accordance with the angle of rotation of pointer-scanning lever 5, as is well known, the shutter speed may be controlled and the exposure completely programmed.

Figure 3:
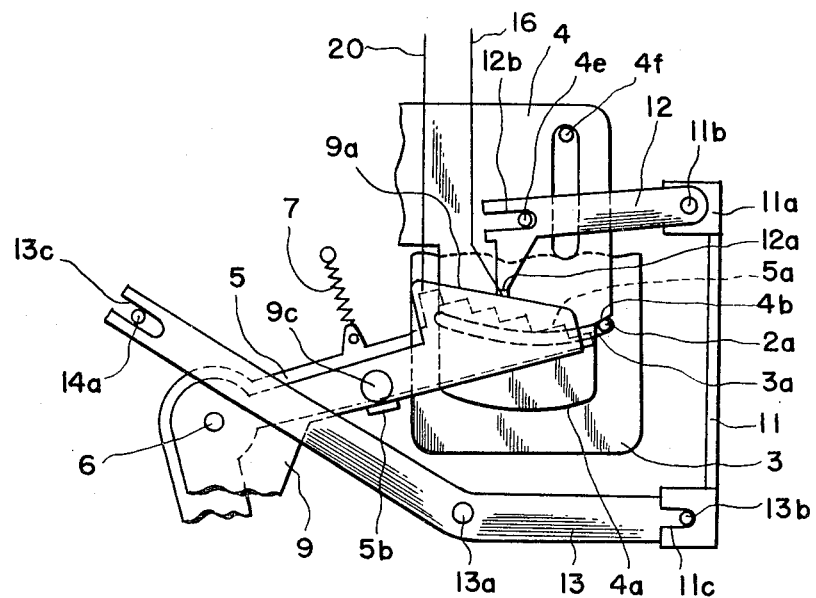
FIG. 3 is a front view of the switching device showing the position of the components, where the photographic distance is in a suitable range for flash photography.

In the case of automatic flash exposure as shown in FIGS. 1 and 3, pointer 2a of ammeter 2 is located in the right end position in slot 3a of pointer carrier 3. In this situation, when the photographic distance adjusted by distance adjusting member 14 is within a range suitable for flash photography as release lever 1 is depressed, upper transverse rod 1a thereof and pointer keeper plate 4 moves downwardly, and pointer keeper portion 4a continues its downward movement without coming into contact with pointer 2a, which is located in the right end portion of slot 3a. At that time-retaining member 12 also continues its counterclockwise rotation by means of working pin 4e, until when notched stepped portion 4b comes into contact with pointer 2a the downward movement of pointer keeper portion 4a is stopped. On the one hand at that time, when pointer-scanning lever 5 is rotated counterclockwise in consequence of the movement of lower transverse rod 1b, stepped portion 5a of lever 5 continues its rotation without coming into contact with pointer 2a located at the right end portion in slot 3a. Diaphragm control cam 9a of diaphragm control lever 9, which is rotated with pointer-scanning lever 5, comes into contact with stopper surface 12a projecting into the rotation track and the rotation is stopped. The position of working pin 4e is fixed at this juncture, so that the position of stopper surface 12a is fixed exclusively by the position of pin 11b of sliding plate 11, in accordance with the rotational position of distance adjusting member 14.

That is, when the focus is adjusted for a shorter distance the aperture made by the diaphragm blades 10 is smaller and as the focus is adjusted for a longer distance, the aperture of the diaphragm is larger. And thus, the flash photography exposure is automatically determined and at the same time the switching device connected between flash circuit lead wires 16, 20 is closed securely by the contact of diaphragm control cam 9a and stopper surface 12a through the force of spring 7. Release lever 1 is depressed to start the shutter mechanism (not shown) and close synchro-contact 18, so that the flash device is actuated in synchronization with release of the shutter.

Figure 4:
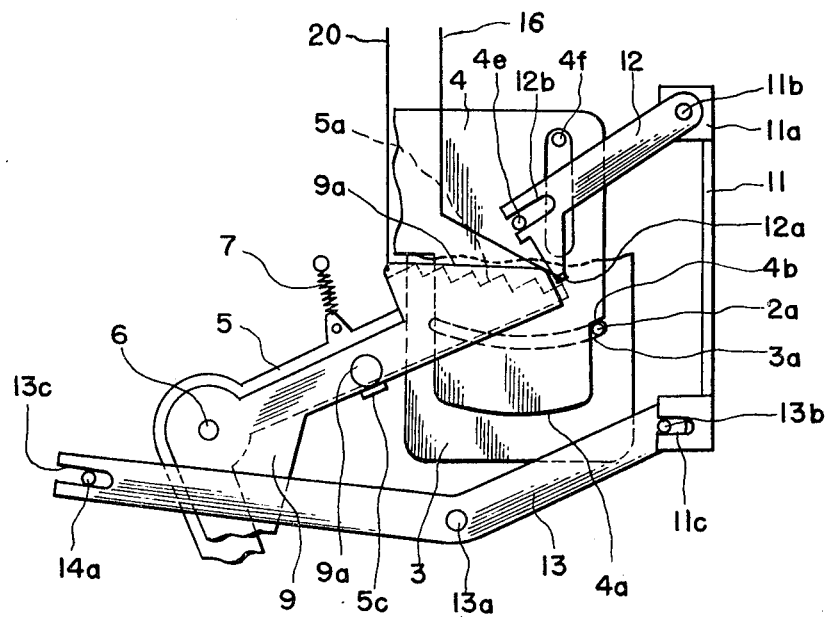
FIG. 4 is a front view of the switching device showing the position of the components where the photographic distance is not in a suitable range for flash photography.

The case of preventing the closing of the flash circuit is described with respect to FIGS. 1 and 4 and is such that, as described above, the focus is adjusted by degrees for a longer distance and at last when the diaphragm aperture is opened fully the picture gets dark.

In such a case, by adjusting for a long distance, even though sliding plate 11 is moved upwardly, accordingly, pin 11b is positioned upwardly, and notched step 4b of pointer keeper plate 4 moves downwardly to contact pointer 2a in interlocking with depressed release lever 1. Stopper surface 12a retracts to the outside of the rotational track of diaphragm control cam 9a and accordingly control cam 9a does not come into contact with stopper surface 12a and the flash circuit stays open. Therefore, even though release lever 1 is successively depressed, the flash is avoided so that the flash lamp is not unnecessarily consumed.

Further, in this case, by making use of the rotational movement of diaphragm control lever 9 and its noncontact with stopper surface 12a it is also possible to lock release lever 1.

We claim:

1. A device for controlling a flash in a camera having an automatic exposure control mechanism including an ammeter pointer operated in accordance with the brightness of the scene to be photographed, a shutter release mechanism, a diaphragm control mechanism for effecting a desired diaphragm setting, and a distance adjustment mechanism, comprising:

a pointer keeper mechanism slidably mounted to said camera and operated by said shutter release mechanism and including a surface having a portion for retaining said meter pointer and a notched portion engaging said pointer at an extreme range of movement thereof and of said pointer keeper mechanism and including a first switch contact, means interconnecting said pointer keeper mechanism and said distance adjustment mechanism, a scanning mechanism connected at one end thereof to said shutter release mechanism and rotatably mounted to said camera intermediate the ends thereof, a control lever connected at one end thereof to said diaphragm control mechanism and including at the other end thereof a second switch contact, said lever is rotatably mounted intermediate the ends thereof to said camera, a flash circuit for providing a flash and electrically interconnected between said first and second switch contacts, whereby depression of said shutter release mechanism rotates said first switch contact into engagement with said second switch contact to complete said flash circuit in accordance with a desired diaphragm setting, a predetermined range of movement of said distance adjusting mechanism and with said pointer and said pointer keeper mechanisms at said respective extreme range of movements.

2. A device as in claim 1 wherein said means interconnecting said pointer keeper mechanism and said distance adjustment mechanism rotate in accordance with the setting of said distance adjusting mechanism whereby with said pointer and said pointer keeper mechanism at said respective extreme range of movements and with said distance adjusting mechanism set at a distance unsuitable for flash photography said first switch contact is rotated so that said first and second switch contacts are in noncontacting relationship.

3. A device as in claim 1 wherein said first contact is restrained from contacting said second switch contact by engagement of said pointer keeper mechanism surface engaging said pointer in a range of movement thereof suitable for daylight photography.

* * * * *